May 20, 1930.  D. I. REITER  1,759,418
SNAP FASTENER
Filed Feb. 2, 1928
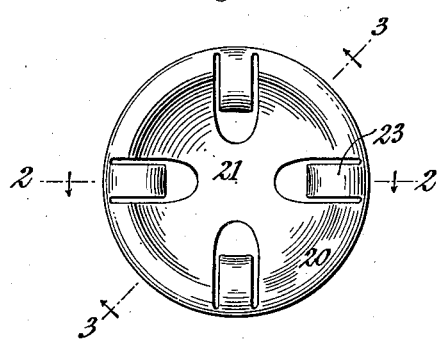
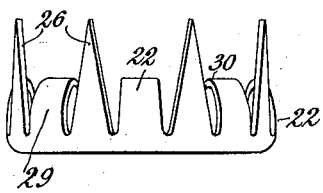
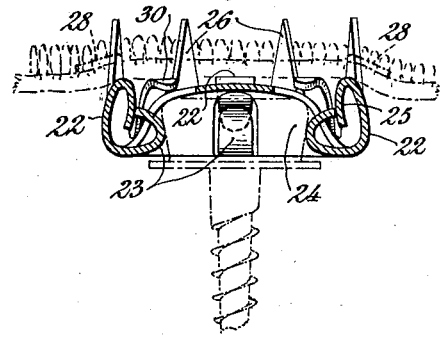
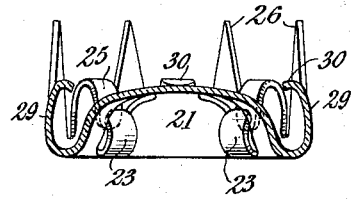
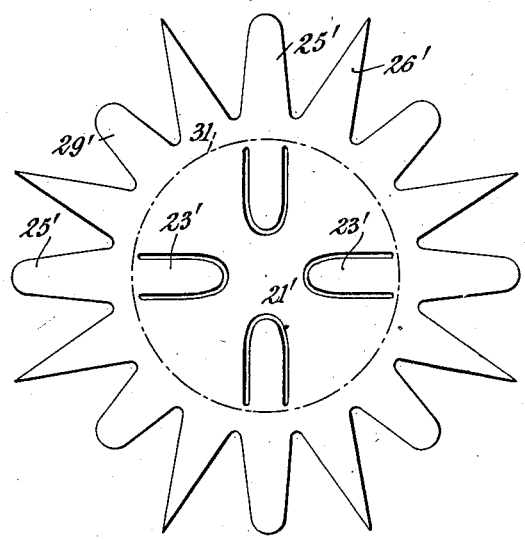
INVENTOR:
Daniel I. Reiter,
By Attorneys,
Fraser, Myers & Manley.

Patented May 20, 1930

1,759,418

UNITED STATES PATENT OFFICE

DANIEL I. REITER, OF NEW YORK, N. Y.

SNAP FASTENER

Application filed February 2, 1928. Serial No. 251,286.

This invention relates to a socket member for a snap fastener of general application, but which is particularly adapted for use in attaching a rug to a floor.

It is an object of the invention to provide a strong and durable snap fastener socket member of such simple construction that it may be manufactured on a highly economical basis.

A snap fastener socket embodying the invention, preferably made from a single piece of metal, may comprise resilient reinforced stud-retaining elements, a thumb-piece adapted to serve as a sounding element to receive the impact of or amplify the sound produced by an inserted stud, spurs or other appropriate means whereby the socket may be secured to a rug or other article to which it is intended to be attached, and means for maintaining the sounding element slightly separated from the surface of such article.

The reinforced stud-retaining elements are adapted to maintain a firm and secure attachment between the socket member and its stud. The thumb-piece which forms the sounding element prevents the material to which the device is attached from being thrust into the stud-receiving space and registers audibly the effective insertion of the socket into its holding relation with the retaining elements of the stud, and the means by which the sounding element is maintained slightly separated from the surface of the article to which the socket element is attached prevents the deafening or muffling of the sounding element such as would render it ineffective.

It has been found as a matter of experience that an audible click or snap, clearly indicating that the stud has effectively entered the socket so as to be firmly grasped and held by the stud-retaining elements, is relied upon by users as evidence that the fastener has functioned properly and is an efficient article.

Referring to the accompanying drawings illustrating a preferred form of the invention:—

Figure 1 is a plan view of a snap fastener socket member embodying the invention herein to be described.

Fig. 2 is a cross-sectional view of the same socket element, the section being taken along the line 2—2 of Fig. 1.

Fig. 3 is a cross-sectional view of the same socket member, the section being taken along the line 3—3 of Fig. 1.

Fig. 4 is a side view of the socket member.

Fig. 5 is a plan view of a blank from which the preferred form of socket member illustrated in Figs. 1 to 4, inclusive, may be constructed.

In the form of the invention herein disclosed for purposes of illustration, the invention comprises a disk 20 dished at the center as at 21 and flanged at the periphery as at 22.

Surrounding the dished central portion of the disk, resilient stud-retaining fingers 23 of any appropriate number may be provided to receive and retain a stud 24, indicated in broken lines in Fig. 2. These stud-retaining elements 23 may comprise fingers of metal cut from the central portion of the disk and bent into the stud-receiving recess of the socket member, as clearly indicated in Figs. 1 and 2.

If desired, the stud-retaining elements 23 may be reinforced or strengthened by resilient elements 25 (Figs. 2 and 3), which may comprise fingers cut from an extended portion of the flange 22 and bent into a reinforcing relationship adjacent and transverse to the direction of movement of the ends of the stud-retaining elements.

A portion or portions of metal extending beyond the flange 22 may be used as a means whereby the socket member may be secured to a rug or other desired article. This may be effected by causing portions of said flange to terminate in any suitable number of attaching spurs 26, which may be inserted into the material of the rug 27 or other article indicated in broken lines in Fig. 2, and bent downwardly as indicated in broken lines at 28, Fig. 2, so as to be buried in the pile of the material.

The dished central portion 21 of the socket member is an important element of the invention in that it is so positioned as to receive the blow or impact of a stud member as the same is forced into the space between the resilient stud-retaining fingers 23. After the largest diameter of the stud passes the most restricted portion of the throat formed by the fingers 23, the return of the fingers to their normal positions tends to suddenly force the stud member inwardly and cause its head to impart a blow or impact against the member 21, resulting in an audible snap or click. This snap or click is an important feature of a snap fastener since users of such devices quite commonly draw the conclusion that the fastener is ineffective or inefficient, or even damaged, if the audible sound is not produced when the stud is forced into its engaging relation with the socket. Even if the head of the inserted stud 24 is not permitted to be brought into contact with the dished portion 21, it serves as an effective sounding element by preventing the soft overlying material from entering the socket and by amplifying the vibrations set up when the stud is snapped into engaging relationship with the fingers 23.

In order that the sounding element 21 may not be muffled and thereby render ineffective, any appropriate means may be provided whereby it may be held slightly separated from the surface of the rug or other article to which the fastener is intended to be attached. As herein disclosed, the reinforcing members 25 for the stud-retaining fingers 23 are so positioned as to serve as a part of such separating means, as clearly indicated in Figs. 2 and 3. If desired, additional limiting stops may be provided, such additional stops comprising fingers 29 which may be cut from the metal extending beyond the flange 22, and which may have their ends bent inwardly, as indicated at 30 (Figs. 2 and 3), to form rounded surfaces adapted to receive the surface of the material to which the socket member is secured.

The element 21 is properly positioned to receive the thrust of the thumb when applying the socket to the stud and to prevent the material of the article to which the socket is attached from being forced into the stud-receiving space and thereby muffling the sound.

It will be apparent that the number of stud-retaining fingers, attaching spurs and limiting stops may be varied and that either the reinforcing fingers 25 or the limiting stops 29 may alone be relied upon to maintain the sounding element at a slight distance from the surface of the article 27 to which the socket member is attached. It will also be apparent that the attaching spurs 26 and the limiting stops 29 may be bent either inwardly or outwardly.

An appropriate form of blank from which the preferred form of the invention may be constructed is illustrated in Fig. 5, said blank comprising a single disk of metal cut into a star-like configuration, having fingers 23' cut from the central portion of the blank from which the stud-retaining fingers 23 may be formed. The radiating elements of the star comprise fingers 25' from which the reinforcing fingers 25 may be formed, fingers 26' from which the attaching spurs 26 may be formed, and fingers 29' from which the limiting stops may be formed. The socket member of Figs. 1 to 4, inclusive, may be readily formed from the blank illustrated in Fig. 5 by merely dishing the central portion 21' of the blank, flanging the blank by the use of dies, or by spinning, or in any other suitable manner known to those skilled in the art of metal working, thereby causing it to be bent along the broken circular line 31, after which the various fingers may be bent to their appropriate forms. If desired, the blank may first be drawn or spun to its cup-like form and subsequently cut to provide the fingers from which the stud-retaining elements, reinforcing elements, limiting stops and attaching spurs are formed.

The socket member may be made from sheet brass or any other suitable material.

It will be apparent from the foregoing description that snap fastener socket members embodying the invention may be manufactured at a minimum cost for material and workmanship, and that the resulting product may be specially designed for heavy service and durability.

The invention is not intended to be limited to the preferred form herein selected for purposes of illustration, but should be regarded as including modifications and variations thereof within the scope of the appended claims.

What is claimed is:

1. A snap fastener socket member having inwardly-directed stud-retaining fingers, a centrally-disposed guard and thumb-piece adapted to serve as a resonant sounding element to enhance the sound produced by an inserted stud, and a plurality of pointed fastening spurs all comprising integral parts of a single sheet of metal, said spurs being extended back with respect to the open face of the socket member well beyond the surface of the sounding member.

2. A snap fastener socket member having resilient stud-retaining fingers, resilient reinforcing fingers therefor having their free ends closely adjacent and in positions transverse to the directions of movement of the ends of the stud-retaining fingers, whereby the reinforcing fingers will be engaged and yieldingly but forcibly resist the flexing of the retaining fingers during the insertion of a stud, and a plurality of fastening spurs, all comprising parts of a single sheet of metal.

3. A snap fastener socket member having resilient stud-retaining fingers, resilient reinforcing fingers therefor having their free ends adjacent and in positions transverse to the directions of movement of the ends of the stud-retaining fingers, and a centrally disposed sounding element to enhance the sound produced by an inserted stud, all comprising parts of a single sheet of metal.

4. A snap fastener socket member having a plurality of resilient stud-retaining fingers and a plurality of closely adjacent resilient reinforcing fingers therefor in positions transverse to the directions of movement of the ends of the stud-retaining fingers, whereby the reinforcing fingers will be engaged and yieldingly but forcibly resist the flexing of the retaining fingers during the insertion of a stud.

5. A snap fastener socket member having stud-receiving elements, a centrally-disposed sounding element to enhance the sound produced by an inserted stud, fastening means whereby said socket member may be secured to the article on which it is to be used, and limiting stops terminating above the level of the sounding element to maintain said sounding element slightly separated from the surface of said article.

6. A snap fastener socket member comprising a flanged, dished, metal disk, and resilient stud-retaining elements comprising fingers cut from the dished part of said disk and bent to appropriate stud-retaining form, the flanged portion of said disk including means whereby the socket member may be secured to the article on which it is intended to be used, and the remaining central part of the dished portion of the disk, lying within and between the fingers, being adapted to serve as a centrally-disposed sounding element.

7. A snap fastener socket member having stud-retaining means, a centrally-disposed sounding element to enhance the sound produced by an inserted stud, means whereby the socket member may be secured to the article on which it is to be used, with its sounding element interposed between its stud-retaining means and the surface of such article, and separating means to hold the sounding element clear of the surface of said article, all parts of said socket member being made of a single piece of metal.

8. A snap fastener socket member having resilient reinforced stud-retaining elements, each comprising two fingers bent about the stud-receiving recess from opposite directions to positions such that one is closely adjacent and transverse to the direction of movement of the end of the other, whereby the former will be flexed by the latter when the latter is flexed by a stud head at each insertion or withdrawal, the latter being thus reinforced by the former.

9. A blank to be used in the making of a snap fastener socket member, said blank comprising inwardly directed fingers, cut from its central portion, adapted to serve as stud-retaining elements in the finished structure, and three groups of fingers cut from the marginal portion of the blank adapted to serve, respectively, in the finished structure, as fastening spurs, limiting stops, and reinforcing elements for the stud-retaining elements, the central portion of the blank other than that used to form the first-mentioned fingers being adapted to serve as a sounding member in the finished structure.

In witness whereof, I have hereunto signed my name.

DANIEL I. REITER.